United States Patent [19]

Holst et al.

[11] 4,061,692

[45] Dec. 6, 1977

[54] PROCESS FOR THE MANUFACTURE OF SWELLABLE, ABSORPTIVE POLYMERS OF POLYHYDROXY METHYLENE

[75] Inventors: Arno Holst; Michael Kostrzewa, both of Wiesbaden, Germany

[73] Assignee: Hoechst Aktiengesellschaft, Germany

[21] Appl. No.: 722,624

[22] Filed: Sept. 13, 1976

[30] Foreign Application Priority Data

Sept. 15, 1975 Germany .............................. 2541035

[51] Int. Cl.$^2$ ..................... C08F 291/08; C08F 18/24; C08F 261/00
[52] U.S. Cl. ............................. 260/874; 260/77.5 UA
[58] Field of Search ........................ 260/77.5 UA, 874

[56] References Cited

U.S. PATENT DOCUMENTS

| 2,918,478 | 12/1959 | Newman | 260/77.5 UA |
| 3,331,800 | 7/1967 | Schubel et al. | 260/77.5 UA |

FOREIGN PATENT DOCUMENTS

| 667,451 | 7/1963 | Canada | 260/77.5 UA |

Primary Examiner—Herbert J. Lilling
Attorney, Agent, or Firm—James E. Bryan

[57] ABSTRACT

This invention relates to a process for the manufacture of absorptive polymers which are at least preponderantly insoluble in water, but capable of swelling in water, which comprises etherifying polyhydroxy methylene in a homogeneous phase in an aqueous alkaline solution with an α-halogen carboxylic acid, and prior to, during, or after the etherification process performing a further reaction with a cross-linking agent which is polyfunctional towards polyhydroxy methylene in an alkaline medium.

5 Claims, No Drawings

PROCESS FOR THE MANUFACTURE OF SWELLABLE, ABSORPTIVE POLYMERS OF POLYHYDROXY METHYLENE

The present invention relates to a process for the manufacture of absorptive polyhydroxy methylene polymers which are completely or preponderantly insoluble in water, but capable of swelling in water.

Absorptive polymers capable of swelling in water are known, both in the form of natural products and synthetic materials. They are used, for example, as water-absorbing components of medical or hygienic articles and must have a high absorption capacity, among others for aqueous liquids.

It is known to meet these requirements by preparing inherently water-soluble cellulose ethers and to cross-link or otherwise modify them in a manner such that they are at least partially insoluble in water, but are capable of absorbing relatively large quantities of water and retaining them even under stress (cf. German Offenlegungsschriften Nos. 1,912,740, 2,357,079, and 2,358,150).

The cross-linking or other modifying agents are added prior to, during, or after etherification; they are polyfunctional towards cellulose. The hitherto known cross-linked or otherwise modified swellable cellulose ethers have the essential disadvantage that they are somewhat unstable towards chemical and enzymatic influences, so that their range of applications is partially limited.

It is the object of the present invention to provide a process for the manufacture of swellable, absorptive polymers, the polymer structure of which does not have this drawback.

This object is achieved by etherifying polyhydroxy methylene in an aqueous-alkaline solution in a homogeneous phase with an α-halogen carboxylic acid and, additionally, reacting it prior to, during, or after etherification with a cross-linking agent which is polyfunctional towards polyhydroxy methylene in an alkaline medium. The reaction conditions and quantities of the reaction components are so selected that, if the product were not cross-linked, the etherification process would lead to a water-soluble product, but the cross-linking step is performed in such a manner that the products according to the present invention become completely or preponderantly, i.e. to more than 50 per cent by weight, insoluble in water. The swelling produced by the addition of water is gel-like and amorphous, such as that of gelatinized starch. The water retention capacity of the material swollen with water under 2000 times the acceleration of gravity is excellent and in some cases is more than 10,000 per cent by weight.

The polyhydroxy methylene used as the starting material is described, for example, by H. C. Haas and N. W. Schuler in "J. Polym. Science," Vol. 31, pages 237-239 (1958).

In order to be able to operate with a homogeneous solution, which has the advantage, for example, that a very uniform substitution is obtained, a 20 to 50 per cent by weight, preferably about 30 per cent by weight alkali hydroxide solution is used. A thorough mixing of the reaction medium is possible, if about 4 moles of NaOH, for example in the form of a 30 per cent by weight sodium hydroxide solution, are reacted with 1 mole of polyhydroxy methylene.

The degree of substitution of the products obtained, calculated on the total number of hydroxyl groups, is lower than that of many known cross-linked cellulose ethers, but the water retention capacity of the products manufactured according to the present invention is very high. Generally, it is not advisable to attempt to raise the degree of substitution above 0.2, because the quantity of cross-linking agent to be used in such a case in order to achieve a similar effect becomes too large and may amount, for example, to more than 0.5 mole per basic polyhydroxy methylene

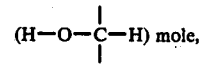

so that the process becomes uneconomical in relation to the effect achieved. The substitution of the polyhydroxy methylene is surprising because almost exclusively secondary hydroxyl groups are available for substitution from which it is known that they are not easily etherified and, moreover, a large proportion of the etherifying agent is saponified under the alkaline conditions prevailing.

α-Halogen carboxylic acids with 2 to 5 carbon atoms may be used as etherifying agents in the process according to the invention. Chlorine, bromine, or iodine are the halogens used. The use of chloro acetic acid is particularly preferred.

Compounds which may be used as cross-linking agents are, for example: epoxy compounds, halohydrins, polychlorinated higher alcohols, divinyl sulfone, acid chlorides, dichloro acetic acid, or those compounds in which the groups which are functional towards polyhydroxy methylene are either:

the acryl amido group

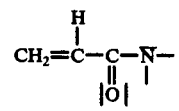

the chloro azomethine group

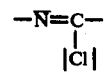

or the allyloxy azomethine group

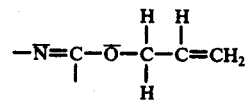

Advantageously, 20 to 50 per cent by weight, preferably about 30 per cent by weight aqueous NaOH solutions are used for the process according to the invention. The reaction temperature during cross-linking is normally in the range of about 70° to 90° C.

The cross-linked polyhydroxy methylene ethers are distinguished by the fact that as far as their polymer structure is concerned, they cannot be easily decomposed by enzymatic influences, so that they may be used for a wide range of applications in the biochemical, medical, or physiologico-chemical industries. In addition, they have a high water retention capacity.

The abbreviations used in the examples have the following meanings:
- WRV = water retention capacity in per cent by weight, measured at 2,000-times the acceleration of gravity and based on the water-insoluble portion of the total product.
- SV = absorption capacity in per cent by weight, calculated on the total product.
- WUA = water-insoluble part of the total product.
- DS = degree of substitution, determined from sulfate ash.

The water retention capacity (WRV) is determined after immersion of the sample in water, and the absorption capacity (SV) is determined after the sample has absorbed water up to the point of saturation.

EXAMPLE 1

6 g of polyhydroxy methylene (0.2 mole) were dissolved in 106 g of a 30 per cent by weight aqueous NaOH solution (0.8 mole) while heating to 85° C. 23.6 g of an 80 per cent by weight aqueous monochloro acetic acid solution (0.2 mole) were drop-wise added to the solution and the mixture was then heated for 45 minutes to 85° C. Cross-linking was then effected by drop-wise adding a concentrated solution containing 0.99 g (0.005 mole) of bis-acrylamido acetic acid in a little hot water and further heating for 15 minutes to 85° C. After cooling to room temperature, the reaction mixture was poured into 1 liter of methanol and the mixture was neutralized by adding glacial acetic acid, phenolphthalein serving as the indicator. The precipitate which formed was filtered off and washed three times with methanol. Yield: 5.8 g = 76 per cent of theoretical.
- DS = 0.1
- WUA = 56%
- WRV = more than 10,000%
- SV = 800%.

EXAMPLE 2

The procedure described in Example 1 was repeated, except that 1.8 g (0.009 mole) of bis-acrylamido acetic acid were used for cross-linking. Yield: 5.7 g = 71.7 per cent of theoretical.
- DS = 0.12
- WUA = 54%
- WRV = 14,000%
- SV = 740%.

EXAMPLE 3

The procedure described in Example 1 was repeated, except that 3.6 g (0.018 mole) of bis-acrylamido acetic acid were used for cross-linking. Yield: 5.9 g = 78.4 per cent of theoretical.
- DS = 0.095
- WUA = 66%
- WRV = 6,900%
- SV = 920%.

EXAMPLE 4

The procedure described in Example 1 was repeated, except that 1.54 g (0.01 mole) of methylene-bis-acrylamide were used as the cross-linking agent. Yield: 5.5 g = 72.2 per cent of theoretical.
- DS = 0.1
- WUA = 55%
- WRV = 3,800%
- SV = 980%.

It will be obvious to those skilled in the art that many modifications may be made within the scope of the present invention without departing from the spirit thereof, and the invention includes all such modifications.

What is claimed is:

1. A process for the manufacture of absorptive polymers which are at least more than 50 per cent by weight insoluble in water, but capable of swelling in water, which comprises etherifying polyhydroxy methylene in a homogeneous phase in an aqueous alkaline solution with an $\alpha$-halogen carboxylic acid, and prior to, during, or after the etherification process performing a further reaction with a cross-linking agent which is polyfunctional towards polyhydroxy methylene in an alkaline medium selected from the group consisting of epoxy compounds, halohydrins, polychlorinated higher alcohols, divinyl sulfone, acid chlorides, dichloroacetic acid and compounds in which the groups which are functional towards polyhydroxy methylene are the acryl amido group, the chloro azomethine group, or the allyloxy azomethine group.

2. A process according to claim 1 in which the $\alpha$-halogen carboxylic acid has 2 to 5 carbon atoms and the halogen is chlorine, bromine or iodine.

3. A process according to claim 1 in which chloro acetic acid is used as the $\alpha$-halogen carboxylic acid.

4. A process according to claim 1 in which an about 20 to 50 per cent by weight aqueous NaOH solution is used.

5. A process according to claim 1 in which the cross-linking reaction is conducted at a temperature between about 70° and 90° C.

* * * * *